Patented Jan. 18, 1927.

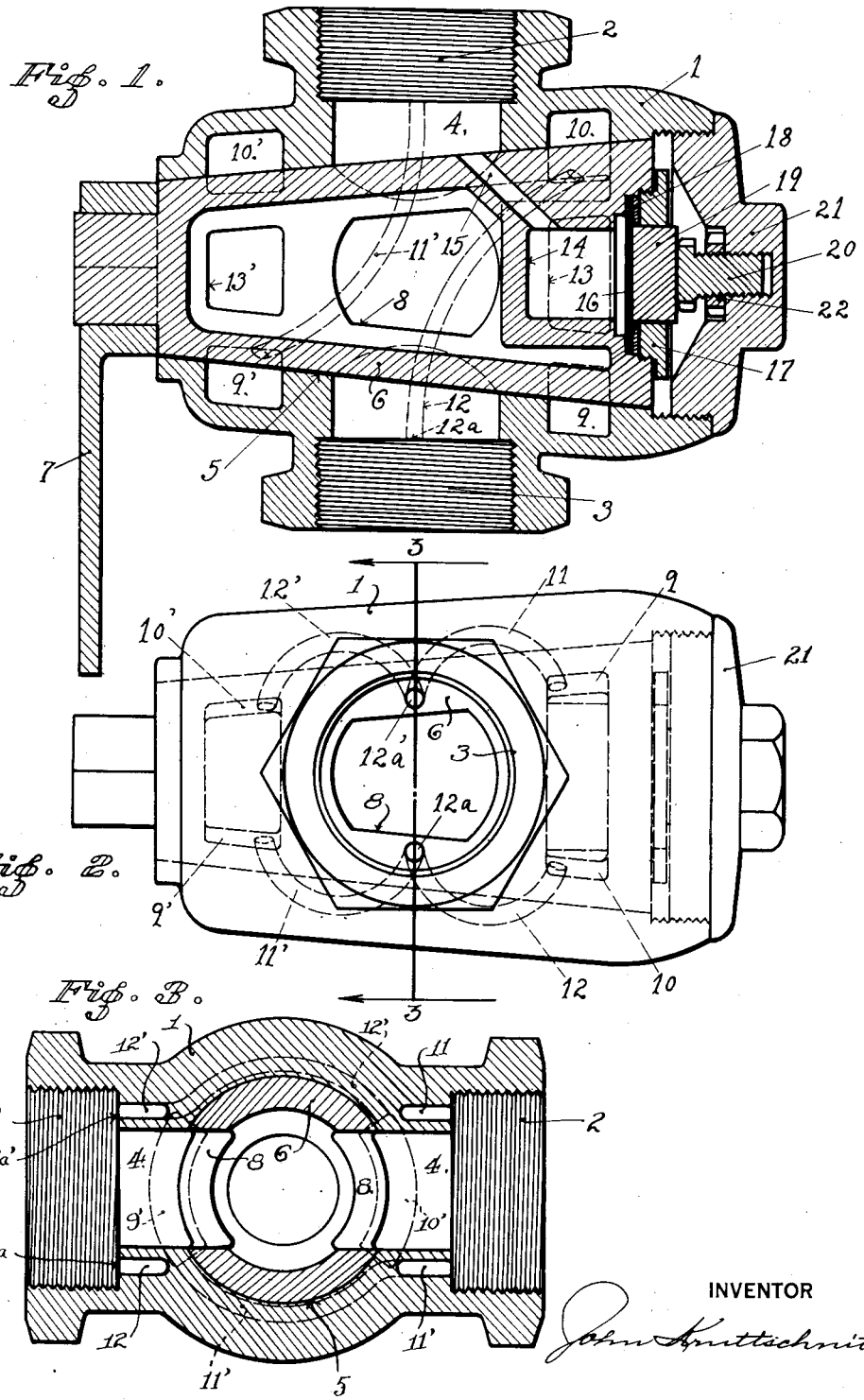

1,614,890

UNITED STATES PATENT OFFICE.

JOHN KRUTTSCHNITT, OF SAN FRANCISCO, CALIFORNIA.

BALANCED-PLUG VALVE.

Application filed January 13, 1926. Serial No. 80,936.

My invention relates to fluid controlling valves of the rotatable plug type, and has for its principal object the provision of means for balancing or equalizing the fluid pressure upon the rotatable member or plug, in order to render said plug easy to turn, even under conditions of very high pressure, and to equalize the wear, so that the plug and its seat will remain true, thereby minimizing the possibility of leakage.

A further object of the invention is to provide means actuated by and proportional to the pressure of the fluid for holding the plug to its seat, so that the valve will function equally well under a wide range of pressure conditions.

With these and other objects in view, a preferred embodiment of my invention will be described fully hereinafter, with the understanding that the form, proportion, and arrangement of the several parts may be varied, within the limits of the claims hereto appended, without departing from the spirit of the invention as expressed in said claims.

Reference should be had to the accompanying drawings, wherein—

Fig. 1 is a central longitudinal section of a valve embodying my invention.

Fig. 2 is an elevation thereof.

Fig. 3 is a transverse section taken in the direction of the arrows approximately on the line 3—3 of Fig. 2.

In the drawings, the reference numeral 1 designates the body of my valve, which has the usual oppositely disposed connections 2 and 3, either one of which may be the inlet and the other the outlet and joined by a continuous passage 4. The body 1 also has the usual tapered or conical seat 5 extending through it perpendicularly to the axis of the passage 4, and intersecting said passage. A rotatable tapered plug 6 is seated within the tapered seat 5, and is provided, at its smaller end, with an exterior handle 7 by which it may be turned. The interior of the plug 6 is hollow, and its wall is provided with oppositely disposed apertures 8 adapted to register with the passage 4 when the plug is turned to the open position shown in Fig. 3. The closed position is shown in Fig. 1, in which the solid portions of the plug wall close the passage 4.

The seat 5 is provided, between its ends and the passage 4, with segmental depressions or chambers 9, 9', 10 and 10'. The chambers 9 and 9' lie at one side of said seat, and the chambers 10 and 10' are respectively opposite, as shown in Fig. 1. The chambers 9 and 9' are respectively connected, by ducts 11 and 11', Figs. 1 and 2, formed in the wall of the body 1, with the fluid connection 2, and the chambers 10 and 10' are similarly connected by ducts 12 and 12' with the connection 3. These ducts are so arranged that they do not cross or communicate with each other. Thus the duct 12 leads from its entrance 12ª in the connection 3, Fig. 2, around one side of the body and toward one end thereof, and terminates in the chamber 10, Fig. 1; and the duct 12' leads from its entrance 12ª', Fig. 2, around the other side of the body and toward the other end thereof, to the chamber 10', Fig. 1. Similarly, the ducts 11 and 11', leading from the connection 2 to the chambers 9 and 9', are symmetrically and oppositely disposed with respect to the ducts 12 and 12', as will be seen from Figs. 1 and 3.

Assuming the connection 2 to be the inlet and 3 the outlet, then with the plug 6 turned to closed position, as shown in Fig. 1, the chambers 9 and 9' are connected with the inlet 2 by the ducts 11 and 11', and the opposite chambers 10 and 10' are connected with the outlet 3 by the ducts 12 and 12'. As a result, the pressure of the fluid within the inlet 2 exerted against the upper side (as viewed in Fig. 1) of the plug is balanced by the pressure within the chambers 9 and 9' exerted against its lower side. The combined area, it should be understood, of the chambers 9 and 9' is approximately equal to that of the passage 4 at the inlet 2, so that the forces acting against the opposite sides of the plug are substantially balanced. Similarly, any pressure which may be exerted against the lower side of the plug at the connection 3 is balanced by the pressure exerted against its upper side at the chambers 10 and 10', the combined area of said chambers 10 and 10' being approximately equal to the area of the passage 4 at the connection 3. I prefer to locate and proportion the chambers 9 and 9' and 10 and 10' so that the forces acting against the two end portions of the plug 6, on one side thereof, are not only approximately equal, in the aggregate, to the force acting against its central region on the opposite side, but are substantially balanced with respect to each other; i. e. the plug may be considered as a balanced beam or lever of the first class, and the pressure in the passage 4, setting up a force against one side, may be considered as a fulcrum upon which the plug is balanced by the forces set up against its other side by the pressure in the opposite chambers 9 and 9' or 10 and 10', as the case may be.

The plug 6 is provided, near one end, with oppositely disposed ports 13, one of which is shown in Fig. 1, adapted to register with the chambers 9 and 10 when said plug is in open position, and it is further provided with similarly disposed ports 13' near its other end adapted to register with the chambers 9' and 10'. These ports 13 and 13' permit free circulation through the chambers 9, 9', 10 and 10' and the ducts 11, 11', 12 and 12' when the valve is open, in order to equalize the difference in pressure which would otherwise exist. Thus the plug 6 is balanced at all times, and is consequently easy to turn, even under conditions of very high pressure.

For the purpose of holding the plug 6 in its seat 5 with a force proportional to the pressure of the fluid in the inlet 2, I provide the following structure. A closed cylinder or chamber 14 is formed within the larger end of the plug 6, and is connected by a duct 15 with the inlet 2 when the plug is in closed position, as shown in Fig. 1. The end of said cylinder is closed by a flexible diaphragm 16, which, for structural considerations I prefer to make of two superimposed disks of thin metal, as shown. The diaphragm is held in position by a cap or plug 17 screwed into the end of the plug 6. A spacing ring or washer 18, having a beveled inner surface, as shown, is preferably interposed between said plug 17 and the diaphragm. The plug 17 has a thrust block 19 extending slidably through it, the inner end of said block bearing against the central portion of the diaphragm, and its outer end bearing against an adjustable stop 20 mounted in a cap 21 which closes the end of the body 1. A lock-nut 22 may be provided for the stop 20, as shown.

It will be seen that the pressure of the fluid in the inlet 2, exerted against the diaphragm 16, the block 19, the stop 20, and the cap 21, holds the plug 6 to its seat with a force proportional to said pressure, so that the valve can be operated easily and without leakage under any pressure conditions.

It should be noted also that my valve is reversible. On account of the symmetrical arrangement of the chambers 9, 9', 10 and 10' and the ducts 11, 11', 12 and 12', either connection 2 or 3 may be the inlet. If the connection 3 is the inlet, then the closed position of the plug will be 180 degrees removed from that shown in Fig. 1, to bring the duct 15 into communication with said inlet.

I claim:—

1. A plug valve comprising a body having an interior seat, oppositely disposed inlet and outlet passages, a pair of chambers formed in said seat adjacent to said outlet, a pair of passages extending from said inlet respectively around opposite sides of said body to said chambers, a second pair of chambers formed in said seat adjacent to said inlet, and a second pair of passages independent of the first pair of passages and extending from said outlet respectively around opposite sides of said body to the second pair of chambers; and a plug member rotatably fitted within said seat to open and close communication between said inlet and outlet.

2. A balanced plug valve comprising a body having an interior seat, oppositely disposed inlet and outlet passages, a pair of chambers formed in said seat above and below said outlet, a pair of passages extending from said inlet respectively around opposite sides of said body to said chambers, a second pair of chambers formed in said seat above and below said inlet, and a second pair of passages symmetrical and substantially parallel with the first mentioned passages and extending from said outlet respectively around opposite sides of said body to the second pair of chambers; and a plug member rotatably fitted within said seat to open and close communication between said inlet and outlet.

3. A plug valve comprising a body having an interior seat and a fluid inlet communicating therewith; a plug member rotatably fitted in said seat and adapted to close and open said inlet, said plug member having a chamber in one end communicating with said inlet; a flexible diaphragm closing the outer end of said chamber; a centrally apertured ring secured to said plug member for retaining said diaphragm in position; a slidable plug mounted in the aperture of said ring with its inner end in contact with said diaphragm; and an adjustable stop carried by the body and adapted for contact with the outer end of said slidable plug.

In testimony whereof I have signed my name to this specification.

JOHN KRUTTSCHNITT.